UNITED STATES PATENT OFFICE.

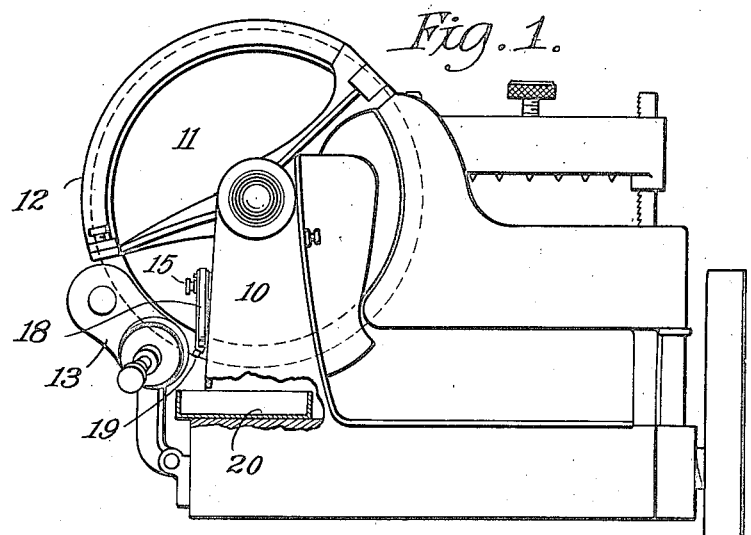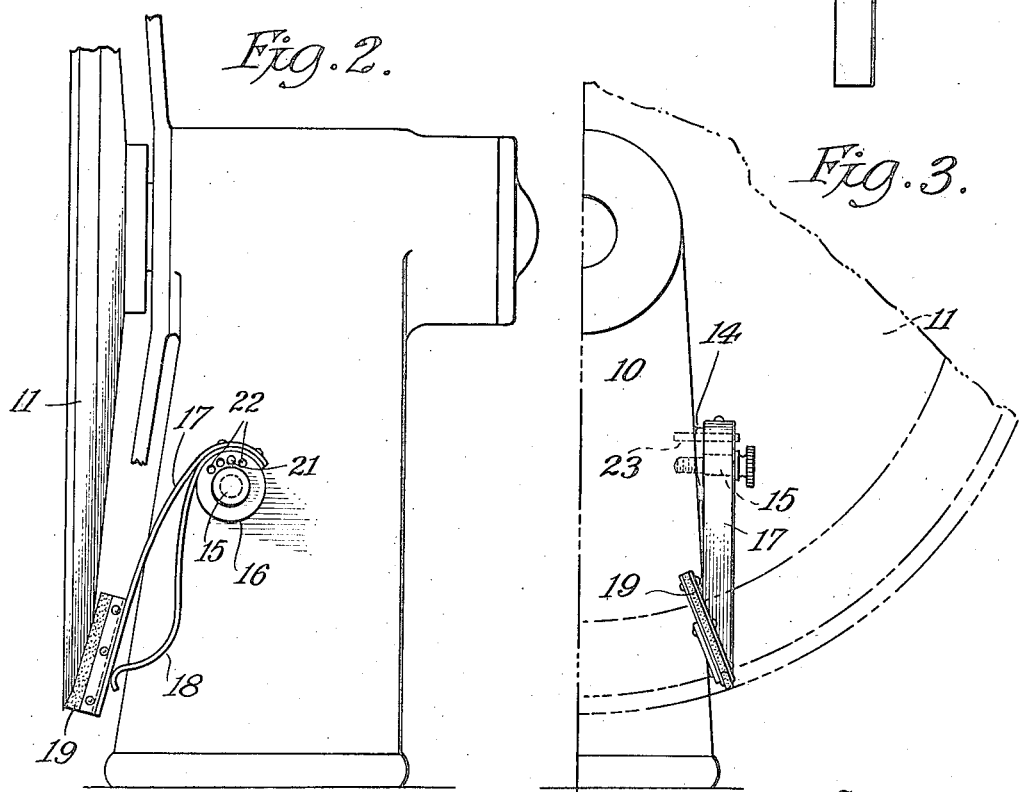

EDWARD G. FREED, OF DAYTON, OHIO, ASSIGNOR TO THE COMPUTING SCALE COMPANY, OF DAYTON, OHIO, A CORPORATION OF OHIO.

MEAT-SLICING MACHINE.

1,419,552.  Specification of Letters Patent.  Patented June 13, 1922.

Application filed February 25, 1921. Serial No. 447,779.

*To all whom it may concern:*

Be it known that I, EDWARD G. FREED, a citizen of the United States of America, residing at Dayton, in the county of Montgomery and State of Ohio, have invented certain new and useful Improvements in Meat-Slicing Machines, of which the following is a full, clear, and exact description.

This invention relates to improvements in meat slicing machines and more particularly to an attachment for the meat slicer shown in the patent to Hopkinson and Thomas, No. 1,263,414. In this prior machine provision is made for sharpening the knife by advancing grinding wheels in contact therewith. These grinding wheels are suitably mounted in a grinding wheels are suitably mounted in a box or casing which is displaceable or removable for cleaning. While the cleaning of the grinder wheels and casing is readily effected with this prior construction, it is desirable that means be provided for preventing or reducing to a minimum the deposit of particles of grease and meat in the box. In the operation of the machine, these particles adhere to the knife and are carried by it during its rotation into the grinder box casing and associated guard parts. The present invention has for its object the provision of an attachment for a meat slicer which will remove these particles from the rotating knife.

Provision is preferably made for removing these particles from the knife prior to the entry of the periphery of the knife into the grinder box or guard and for the collection of the removed particles at a point where they may readily be removed.

Other objects of the invention will be set forth in the accompanying specification and shown in the drawings in which:

Fig. 1 is a side view of a meat slicer to which my attachment is applied.

Fig. 2 is a detail elevation showing the knife and the cleaner block.

Fig. 3 is a similar detail view taken at right angles to the previous view and with the knife shown in dotted lines.

The meat slicer is of well known type having a frame portion including a pedestal 10 supporting a rotating knife 11. The knife is guarded at its periphery by a curved guard 12 and extends into the grinder box casing shown at 113.

Pedestal 10 is provided with a boss 14 which is centrally drilled and tapped to receive a stud 15. This stud extends through and supports a disc 16 which has fastened thereto a plurality of springs 17 and 18. The former spring 17 has attached to its end a block of fibre 19 which is shaped to closely conform to the beveled contour of the knife edge. This fibre block acts as a cleaner to remove the particles of meat or grease which adhere to the rotating knife 11. A suitable removable tray or receptacle 20 may be located below the cleaner block to receive any particles which may drop therefrom. In order to provide for adjusting the tension of spring 17 and thereby bring the cleaner block with proper pressure against the knife I adjust the disc 16 angularly about its supporting stud and thereafter locate and lock it in adjusted position by inserting a locating pin 21 in one or another of the holes 22 and in the single drilled hole 23 in boss 14.

I have found that when the slicer is in operation there is a tendency for the cleaner block to chatter and vibrate to and from the rotating knife. This action prevents proper cleaning and also causes an objectionable ringing sound to be set up. To prevent this objectionable action I provide the supplementary spring 18 which is attached to the disc 16 and is arranged at its opposite free end to bear against the back of the cleaner block. Preferably the spring is made with a wide bow so as to have a period of oscillation differing as much as possible from the tension spring. The supplemental spring retards the setting up of vibrations in spring 17 and keeps the block in proper contact with the knife as well as preventing the objectionable ring or sound heretofore referred to.

When my knife cleaning attachment is used in connection with the slicer illustrated, I locate it in advance of the grinder box so that upon clockwise rotation of the knife (Fig. 1) the meat particles will be removed therefrom before they reach this box or the guard 12. Upon machines of other types the location of the cleaner may be changed, but, generally, it is well to locate it closely after the cutting point so as to remove as many particles as possible before they are thrown from the knife upon adjacent parts.

The use of the cleaning attachment in meat slicers of the type described materially improves the operation of the grinder devices, since it prevents the collection of grease on the grinder wheels which would tend to cause the same to slip when in contact with the knife.

What I claim is:

1. In a meat slicing machine, in combination, a rotating knife, a grinder box into which said knife projects, and means cooperating with said knife, and located between the point of cutting and said grinder box, for removing particles of meat adhering to said knife, whereby the collection of meat particles in the grinder box is minimized.

2. An attachment for a meat slicer having a rotating knife and a frame portion, a spring carried by said frame and extending adjacent the knife, and a cleaning block carried thereby and bearing against the knife for the purpose described.

3. In a meat slicing machine having a rotating knife and a frame portion, in combination, cleaning means for said knife comprising a block contacting with the knife, a spring for resiliently supporting the same from the frame, and means for adjusting the spring tension.

4. In a meat slicing machine having a rotating knife, in combination, a resiliently supported cleaning block contacting with the said knife and a supplementary spring cooperating therewith to prevent the chattering of the cleaning block relatively to said knife.

5. In a meat slicing machine, in combination, a rotating knife, a pedestal therefor, a disc adjustably carried on said pedestal, a pair of springs carried by said disc, a cleaning block carried by one of said springs and bearing against the knife to clean the same of adhering particles, said second spring cooperating with the first spring and the cleaning block to prevent the emission of sound therefrom upon the rotation of the knife.

6. A cleaning device for the rotating knife of a meat slicing machine comprising an adjustable disc, a tension spring carried thereby, a cleaning member carried by said spring and cooperating with the knife, and a supplementary spring attached to said disc and having its free end cooperating with the first mentioned spring and said cleaning member to dampen vibrations of said parts.

In testimony whereof I hereto affix my signature.

EDW. G. FREED.